US008788102B2

(12) United States Patent
Lee

(10) Patent No.: US 8,788,102 B2
(45) Date of Patent: Jul. 22, 2014

(54) AIR CONDITIONER

(75) Inventor: Seung Kwan Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 709 days.

(21) Appl. No.: 13/024,507

(22) Filed: Feb. 10, 2011

(65) Prior Publication Data

US 2011/0202182 A1 Aug. 18, 2011

(30) Foreign Application Priority Data

Feb. 12, 2010 (KR) ........................ 10-2010-0013421

(51) Int. Cl.
*G06F 19/00* (2011.01)

(52) U.S. Cl.
USPC ........................................... 700/276; 340/662

(58) Field of Classification Search
USPC ................ 700/278, 276; 340/662, 337; 315/2
See application file for complete search history.

(56) References Cited

U.S. PATENT DOCUMENTS

| | | | | |
|---|---|---|---|---|
| 5,394,259 | A * | 2/1995 | Takahara | 398/108 |
| 5,777,545 | A * | 7/1998 | Patel et al. | 340/12.37 |
| 6,255,961 | B1 * | 7/2001 | Van Ryzin et al. | 340/3.1 |
| 7,336,192 | B2 * | 2/2008 | Aisa | 340/662 |
| 7,436,288 | B2 * | 10/2008 | Shin | 340/12.32 |
| 7,770,403 | B2 * | 8/2010 | Kojima et al. | 62/132 |
| 7,775,452 | B2 * | 8/2010 | Shah et al. | 236/51 |
| 2007/0012052 | A1 * | 1/2007 | Butler et al. | 62/181 |

* cited by examiner

*Primary Examiner* — Kidest Bahta
(74) *Attorney, Agent, or Firm* — Staas & Halsey LLP

(57) ABSTRACT

An air conditioner includes an indoor unit and a remote controller connected to the indoor unit through two lines to receive power from the indoor unit and perform communication with the indoor unit. The indoor unit includes a first modulation switching element to modulate power according to a communication signal that is transmitted to the remote controller, a first demodulation switching element that is driven according to a communication signal transmitted from the remote controller, and a first distribution resistor to demodulate the communication signal transmitted from the remote controller. The remote controller includes a second modulation switching element to modulate power according to a communication signal that is transmitted to the indoor unit, a second demodulation switching element that is driven according to modulated power transmitted from the indoor unit, and a second distribution resistor to demodulate modulated power transmitted from the indoor unit to obtain a communication signal.

14 Claims, 6 Drawing Sheets

AIR CONDITIONER

CROSS-REFERENCE TO RELATED APPLICATIONS

This application claims the priority benefit of Korean Patent Application No. 10-2010-0013421, filed on Feb. 12, 2010 in the Korean Intellectual Property Office, the disclosure of which is incorporated herein by reference.

BACKGROUND

1. Field

Embodiments relate to an air conditioner which supplies power and performs communication using two lines.

2. Description of the Related Art

A conventional air conditioner is an apparatus that cools, heats, or purifies air using transfer of heat generated through a refrigerant evaporation and compression cycle and then discharges the air for air conditioning in a specific space.

The conventional air conditioner includes an indoor unit installed in an independent indoor space, an outdoor unit connected to the indoor unit and installed outside the space, and a remote controller connected to the indoor unit to control the operation of the indoor unit. The outdoor unit and the indoor unit are connected through two power lines and two communication lines (i.e., through a total of four lines) and the indoor unit and the remote controller are also connected through two power lines and two communication lines (i.e., through a total of four lines).

The outdoor unit and the indoor unit perform communication with each other and the indoor unit and the remote controller perform communication with each other through two communication lines according to a predefined communication protocol.

Refrigerant tubes are installed between the outdoor unit and the indoor unit to circulate refrigerant between the outdoor unit and the indoor unit according to a refrigerant cycle.

When an air conditioner is installed, a service technician connects two power lines and two communication lines between an outdoor unit and an indoor unit and then connects refrigerant tubes therebetween and also connects two power lines and two communication lines between the indoor unit and a remote controller.

Here, since the service technician should individually connect two power lines and two communication lines between the indoor unit and the outdoor unit and two power lines and two communication lines between the indoor unit and remote controller, a large number of lines are required to install the air conditioner, increasing line costs and the likelihood of incorrect line connection of power lines and communication lines, thus causing malfunction in communication circuits.

In addition, repair costs are incurred when a communication circuit malfunctions due to incorrect line connection and there is a need to add a device to prevent incorrect line connection, incurring additional costs.

Especially, in the case of a multi-type air conditioner that conditions air in a plurality of independent indoor spaces, pairs of power lines and pairs of communication lines are connected between a plurality of indoor units and remote controllers. Thus, the multi-type air conditioner uses a great number of lines and great crosstalk occurs between the lines, making communication unstable.

As the number of indoor and outdoor units of the multi-type air conditioner increases, installation and management difficulties increase since the number of communication and power lines also increases.

SUMMARY

Therefore, it is an aspect to provide an air conditioner, wherein an indoor unit and a remote controller are connected through two lines to allow the indoor unit and the remote controller to perform communication with each other and to allow the indoor unit to supply power to the remote controller.

It is another aspect to provide an air conditioner, wherein an indoor unit and a remote controller are connected through two lines and a polarity-free unit is connected between the indoor unit and the remote controller to prevent failure due to incorrect line connection and to reduce crosstalk between the lines during communication.

It is another aspect to provide an air conditioner, wherein communication and power supply between an indoor unit and remote controller are performed using circuits including inexpensive resistors and transistors to reduce the manufacturing costs of the circuits used to perform communication and power supply between the indoor unit and the remote controller.

Additional aspects of the embodiments will be set forth in part in the description which follows and, in part, will be obvious from the description, or may be learned by practice of the embodiments.

In accordance with one aspect, an air conditioner including an indoor unit, and a remote controller connected to the indoor unit through two lines to receive power from the indoor unit and perform communication with the indoor unit, wherein the indoor unit includes a first modulation switching element to modulate power according to a communication signal that is transmitted to the remote controller, a first demodulation switching element that is driven according to a communication signal transmitted from the remote controller, and a first distribution resistance element to demodulate the communication signal transmitted from the remote controller, wherein the remote controller includes a second modulation switching element to modulate power according to a communication signal that is transmitted to the indoor unit, a second demodulation switching element that is driven according to a modulated power transmitted from the indoor unit, and a second distribution resistance element to demodulate the modulated power transmitted from the indoor unit to obtain a communication signal.

The indoor unit further may include a power terminal to supply the power, and a first modulation resistance element connected to the power terminal and the first modulation switching element, the first modulation resistance element reducing a level of power provided from the power terminal when the first modulation switching element is turned off.

The first modulation switching element may include a transistor and the modulation resistance element is connected between an emitter and a collector of the transistor.

The indoor unit further may include a first demodulation resistance element to adjust a voltage induced at the first demodulation switching element according to operation of the first modulation switching element.

When the indoor unit transmits a low signal, the power provided from the power terminal may be reduced through the first modulation resistance element and the first demodulation resistance element and the reduced power may be provided to the remote controller to turn off the second demodulation switching element to allow the remote controller to receive a low signal.

The indoor unit may transmit a high signal when no communication signal is transmitted to the remote controller.

The indoor unit may further include a first transmitting terminal, a first receiving terminal, and a third modulation switching element connected to the first receiving terminal, and the third modulation switching element may be driven according to a communication signal transmitted from the first transmitting terminal and may provide the communication signal to the first receiving terminal.

If the second modulation switching element is turned on to maintain a high signal at the first transmitting terminal when a high signal is transmitted to the remote controller, the third demodulation switching element may be turned on due to the maintained high signal, and, if the second modulation switching element is turned off to block a high signal at the first transmitting terminal when a low signal is transmitted to the remote controller, the third demodulation switching element may be turned off due to the blocked high signal.

The remote controller further may include a power unit that is charged with modulated power provided from the indoor unit.

The remote controller may further include a second modulation resistance element connected to the power unit and the second modulation switching element to reduce a level of the power provided from the power unit when the second modulation switching element is turned off.

The second modulation switching element may include a transistor and the second modulation resistance element is connected between an emitter and a collector of the transistor.

The remote controller may further include a second demodulation resistance element to adjust a voltage induced at the second demodulation switching element according to operation of the second modulation switching element.

The remote controller may further include a second transmitting terminal, a second receiving terminal, and a fourth demodulation switching element connected to the second receiving terminal, and the fourth demodulation switching element may be driven according to a communication signal transmitted from the second transmitting terminal and may provide the communication signal to the second receiving terminal.

In accordance with another aspect, an air conditioner includes an indoor unit including a modulation switching element to modulate power according to a communication signal, and a remote controller connected to the indoor unit through two lines, wherein, when a modulated power is received from the indoor unit, the remote controller demodulates the modulated power to obtain a communication signal and uses the modulated power as a drive power.

When a communication signal is received from the remote controller, the indoor unit may transmit a high signal to turn on the modulation switching element to maintain power supply to the remote controller.

The remote controller may maintain power supply from the indoor unit when the remote controller provides a high signal to the indoor unit and may block power supply from the indoor unit when the remote controller provides a low signal to the indoor unit.

The indoor unit may determine whether a communication signal of the remote controller is high or low based on whether or not power supply from the indoor unit is maintained.

The modulated power provided from the indoor unit may have a pulse form corresponding to a high signal and a low signal.

The remote controller may further include a bridge diode to rectify power received from the indoor unit.

In accordance with another aspect, an air conditioner includes an indoor unit including a power terminal to output a constant voltage, a first modulation switching element to modulate power from the power terminal according to a communication signal that is transmitted to an external device, and a first demodulation switching element that is driven according to a communication signal received from the external device.

The first modulation switching element and the first demodulation switching element may be connected, and, when the first modulation switching element is turned on, the first demodulation switching element may be turned on to provide the modulated power to the first demodulation switching element, and the indoor unit further may include a first distribution resistance element to demodulate a communication signal from the modulated power provided from the first demodulation switching element.

The first modulation switching element may be turned on when the communication signal is a high signal and is turned off when the communication signal is a low signal, and the indoor unit may further include a first modulation resistance element through which the power flows when the first modulation switching element is turned off.

The indoor unit further may include a first demodulation resistance element to receive power from the first modulation resistance element and to adjust drive power of the first demodulation switching element.

In accordance with another aspect, an air conditioner includes a remote controller including a second demodulation switching element to receive modulated power from an external device and to be driven according to the modulated power, a second distribution resistance element connected to the second demodulation switching element to demodulate the modulated power to obtain a communication signal, and a second modulation switching element to be driven according to a communication signal that is transmitted to the external device.

The remote controller may further include a power unit to be charged with power supplied from the external device and to provide the power as a drive power.

The remote controller may further include a second modulation resistance element to reduce a level of the power provided from the power unit if the second modulation switching element is turned off when the remote controller transmits a signal to the external device.

The remote controller may further include a second demodulation resistance element to adjust a voltage induced at the second demodulation switching element according to operation of the second modulation switching element.

When the second modulation switching element is turned off, power may be provided to the second modulation resistance element and the second demodulation resistance element to block power supply from the external device.

In accordance with the present embodiments, since an indoor unit and a remote controller are connected using two lines so that the indoor unit and the remote controller perform communication with each other and the indoor unit supplies power to the remote controller through the two lines, it may be possible to reduce the number of lines between the indoor unit and the remote controller, thereby reducing material costs, and to easily install the lines, thereby reducing line installation time, and also to reduce crosstalk between the lines, thereby enabling reliable communication.

In addition, since communication and power supply are performed together using a polarity-free unit provided between two lines, it may be possible to prevent failure due to incorrect line connection to enable normal communication.

Further, since parallel processing circuits capable of performing communication and power supply in parallel are designed and manufactured using inexpensive resistors and transistors, it may be possible to reduce manufacturing costs of the parallel processing circuits.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
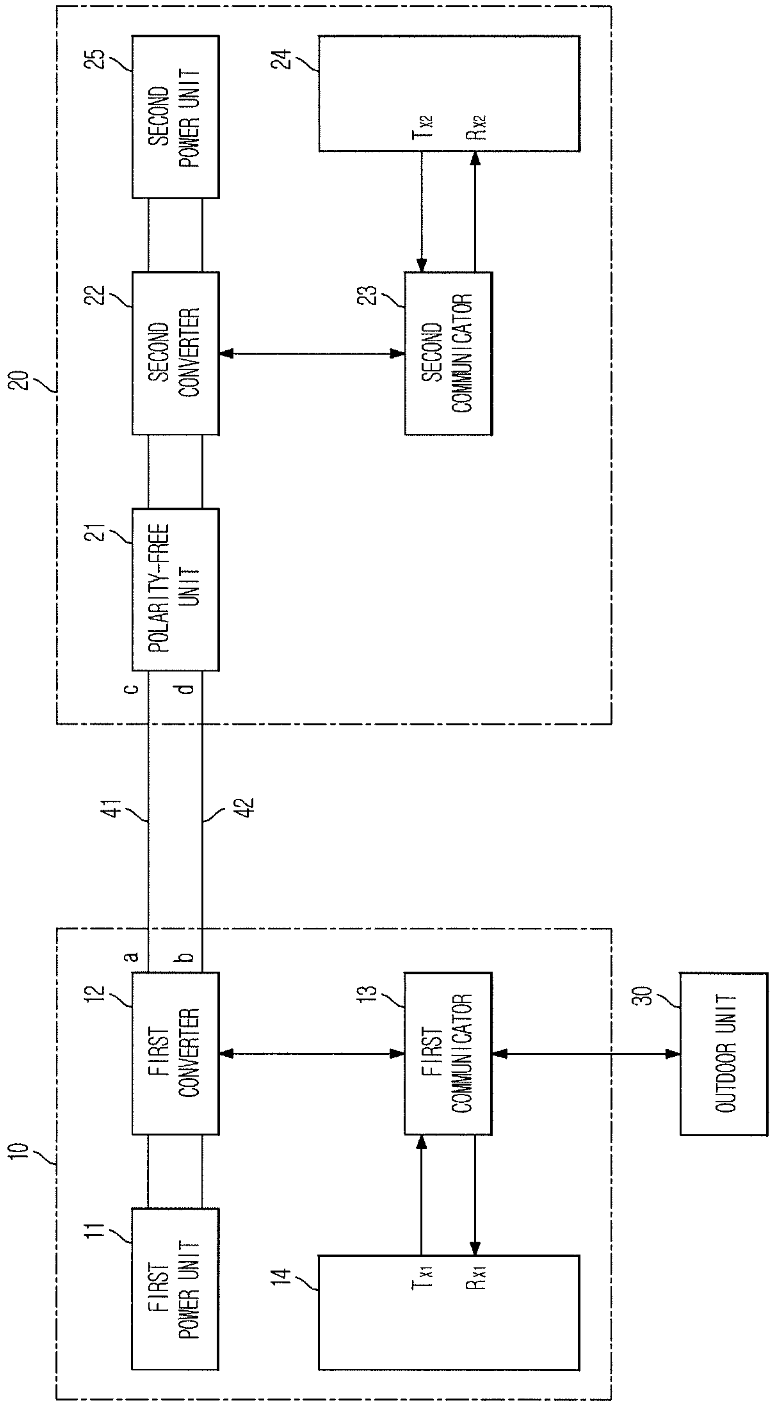
FIG. 1 is a block diagram of an air conditioner according to an embodiment.

Reference will now be made in detail to the embodiments, examples of which are illustrated in the accompanying drawings, wherein like reference numerals refer to like elements throughout.

FIG. 1 is a block diagram of an air conditioner according to an embodiment. The air conditioner includes an indoor unit 10, a remote controller 20, and an outdoor unit 30. The indoor unit 10 is installed in an indoor space. The remote controller 20 controls operation of the indoor unit 10. The outdoor unit 30 is connected to the indoor unit 10 through a refrigerant tube and distributes and controls flow of refrigerant circulating in the indoor unit 10.

The indoor unit 10 and the remote controller 20 are connected through two lines 41 and 42 and perform communication through the two lines 41 and 42. The indoor unit 10 supplies power to the remote controller 20 through the two lines 41 and 42.

Each of the indoor unit 10 and the remote controller 20 has a parallel processing circuit to perform power supply and communication in parallel. The parallel processing circuits are connected through the two lines 41 and 42.

In the case of a multi-type air conditioner, each of a plurality of indoor units 10 also transmits its own identification (ID) information. The ID information, which is preset in each indoor unit 10, is used to inform the remote controller 20 of a space where the indoor unit 10 is installed.

The indoor unit 10 includes a first power unit 11, a first converter 12, a first communicator 13, and a first controller 14.

The first power unit 11 supplies drive power to the remote controller 20. This power is a DC power of about 12V, for example.

The first power unit 11 is provided with power terminals to supply a constant DC voltage. The power terminals are connected to the first converter 12. Thus, power of the first power unit 11 is supplied to the remote controller 20 through the first converter 12.

The first converter 12 is connected to the first power unit 11 and the first communicator 13. The first converter 12 receives power from the first power unit 11. Upon receiving a communication signal corresponding to an instruction of the first controller 14 through the first communicator 13, the first converter 12 modulates the power according to the communication signal and transmits the modulated signal to a polarity-free unit 21 of the remote controller 20.

The first converter 12 includes a first connection terminal a and a second connection terminal b. The first connection terminal a and the second connection terminal b are connected respectively to a third connection terminal c and a fourth connection terminal d, respectively, of the remote controller.

The first converter 12 may include a first modulator 12*a* and a first demodulator 12*b*.

Upon receiving power from the first power unit 11, the first modulator 12*a* modulates the received power according to a communication signal received from the first communicator 13. The first demodulator 12*b* separates power and a communication signal to reconstruct the original communication signal.

Here, the first demodulator 12*b* transmits the reconstructed communication signal to both a first receiving terminal Rx1 of the indoor unit 10 and a second receiving terminal Rx2 of the remote controller 20. This allows the indoor unit 10 to confirm that a communication signal transmitted by the indoor unit 10 has been correctly transmitted to the remote controller 20.

The first converter 12 receives a communication signal corresponding to an indoor unit operation control command from the remote controller 20. The first converter 12 reconstructs the signal received from the first converter 12 into an original communication signal and transmits the reconstructed communication signal to a first receiving terminal Rx1 of the first communicator 13.

When the indoor unit 10 does not transmit a communication signal to the remote controller 20, a first transmitting terminal Tx1 of the first communicator 13 of the indoor unit 10 outputs a high signal. That is, upon receiving a communication signal corresponding to an indoor unit operation control command from the remote controller 20, the first transmitting terminal Tx1 of the first communicator 13 of the indoor unit 10 outputs a high signal.

When a high communication signal is received from the remote controller 20, the level of current flowing in the first converter 12 of the indoor unit 10 is maintained so that the first converter 12 receives a high communication signal from the first transmitting terminal Tx1 of the first communicator 13. When a low communication signal is received from the remote controller 20, the level of current flowing in the first converter 12 of the indoor unit 10 is reduced to block flow of the signal so that the first converter 12 receives a low communication signal from the first transmitting terminal Tx1 of the first communicator 13.

The first communicator 13 is provided between the first converter 12 and the first controller 14.

The first communicator 13 transmits a communication signal received from the first controller 14 to the first converter 12 and transmits a signal received from the remote controller 20 to a first receiving terminal Rx1 of the first controller 14.

The first controller 14 controls the overall operation of the indoor unit 10 according to a communication signal received from the remote controller 20.

That is, the first controller 14 analyzes a communication signal received from the remote controller 20, controls an operation mode of the indoor unit 10 according to the analyzed result, and controls the operation of an indoor fan (not shown), a blade (not shown), or the like so that the temperature of the indoor space is maintained at a target temperature set by a user.

The first controller 14 transmits a communication signal corresponding to indoor information such as indoor temperature and humidity, operation status information, or the like to the first communicator 13.

The indoor unit 10 includes an indoor heat exchanger (not shown) and an indoor fan (not shown). The indoor heat exchanger is connected to the outdoor unit 30 through a refrigerant tube (not shown) and absorbs external heat while vaporizing liquid refrigerant conveyed from the outdoor unit 30 after being expanded by an expansion unit (not shown) in the outdoor unit 30. The indoor fan blows indoor air into the indoor heat exchanger. The indoor heat exchanger is connected to the refrigerant tube and the refrigerant tube (not shown) is connected to the outdoor unit 30 through an external refrigerant tube.

The remote controller 20 is installed at a remote location from the indoor unit 10 and is connected to the indoor unit 10 through the two lines 41 and 42. The remote controller 20 receives drive power from the indoor unit 10 and performs communication with the indoor unit 10 through the two lines 41 and 42.

The remote controller 20 includes a manipulation unit (not shown) that is manipulated to set an operation mode, a target temperature, or the like and a display unit (not shown) to display an operation status of the indoor unit 10.

The remote controller 20 transmits a communication signal corresponding to at least one manipulation of the manipulation unit associated with an operation mode, a target temperature, and the like of the indoor unit 10 to the indoor unit 10 and displays indoor temperature and humidity information, operation status information of the indoor unit 10, or the like transmitted from the indoor unit 10 on the display unit.

The remote controller 20 includes a polarity-free unit 21, a second converter 22, a second communicator 23, a second controller 24, and a second power unit 25.

The polarity-free unit 21 includes third and fourth connection terminals c and d and the third and fourth connection terminals c and d are connected to the first and second connection terminals a and b of the first converter 12 through the two lines 41 and 42, respectively.

The polarity-free unit 21 allows power to be normally output even when a positive voltage terminal and a ground terminal GND, which is a negative voltage terminal, of the power supplied from the first converter 12 of the indoor unit 10 are reversed due to incorrect connection of the two lines 41 and 42.

The polarity-free unit 21 includes a bridge diode (BD) which is a full wave rectification circuit to invert a negative voltage so that only a positive voltage is output. That is, the bridge diode includes diodes which are alternately activated in a positive half period and a negative half period to obtain a full-wave rectified waveform.

The polarity-free unit 21 is connected to the second converter 22 and transmits power, modulated according to an input communication signal through the first converter 12, to the second converter 22.

The polarity-free unit 21 also transmits power and a communication signal transmitted from the second converter 22 to the first converter 12 of the indoor unit 10.

Upon receiving power from the indoor unit 10, the second converter 22 reconstructs a communication signal from the power and transmits the reconstructed communication signal to a second receiving terminal Rx2 of the second communicator 23 and supplies the power to the second power unit 25. Upon receiving a communication signal from a second transmitting terminal Tx2 of the second controller 24, the second converter 22 incorporates the communication signal into the power and transmits the resulting power to the first converter 12 of the indoor unit 10.

The second converter 22 includes a second modulator 22*a* and a second demodulator 22*b*.

The second converter 22 receives a communication signal corresponding to an instruction from the second controller 24 through the second communicator 23 and transmits the received communication signal to the indoor unit 10. This is described below in more detail.

The second modulator 22*a* of the second converter 22 receives a communication signal from the second transmitting terminal Tx2 of the second controller 24 and incorporates the received communication signal into power flowing in the second modulator 22*a* and transmits the resulting power to the first converter 12 of the indoor unit 10.

More specifically, the second modulator 22*a* of the second converter 22 is kept on while a high communication signal is received from the second transmitting terminal Tx2 of the second communicator 23. Accordingly, current flowing in the first converter 12 of the indoor unit 10 is maintained and the first controller 14 in the indoor unit 10 receives a high communication signal through a first receiving terminal Rx1 of the first controller 14 via the first communicator 13.

On the other hand, the second demodulator 22*b* of the second converter 22 is kept off while a low communication signal is received through the second transmitting terminal Tx2 of the second communicator 23. Accordingly, current flowing in the first converter 12 of the indoor unit 10 is reduced and the first controller 14 in the indoor unit 10 receives a low communication signal through the first receiving terminal Rx1 of the first controller 14 via the first communicator 13.

The second demodulator 22*b* of the second converter 22 reconstructs an original communication signal from a communication signal input through the second communicator 23 and transmits the reconstructed communication signal to the second receiving terminal Rx2 of the second controller 24 through the second communicator 23. This allows the remote controller 20 to confirm that a communication signal transmitted by the remote controller 20 has been correctly transmitted to the indoor unit 10.

Upon receiving a communication signal from the indoor unit 10, the second demodulator 22*b* of the second converter 22 reconstructs an original communication signal from the received communication signal and transmits the reconstructed communication signal to the second receiving terminal Rx2 of the second controller 24.

The second communicator 23 is provided between the second converter 22 and the second controller 24.

The second communicator 23 transmits a communication signal received from the second controller 24 to the second converter 22 and transmits a communication signal received from the indoor unit 10 to the second controller 24.

The second controller 24 controls display of the overall operation status of the indoor unit 10 according to a communication signal received from the indoor unit 10 and controls output of a communication signal according to a manipulation of the manipulation unit (not shown).

The second power unit 25 is connected to the second converter 22 and receives power from the second converter 22 and supplies power required to drive each component of the remote controller 20.

The second power unit 25 includes a charge storage element that is charged with part of the power supplied from the second converter 22. The remote controller 20 remains on using the charged power when power from the indoor unit 10 is cut off.

The second power unit 25 includes a constant voltage regulator and adjusts a DC power of about 12V using the constant voltage regulator and supplies a DC power of about 5V as a drive power to each component of the remote controller 20.

The outdoor unit 30 is connected to the indoor unit 10 through a refrigerant tube (not shown), a power line, and a communication line.

The outdoor unit 30 includes a compressor (not shown), an outdoor heat exchanger (not shown), an expansion unit (not shown) such as a capillary tube (not shown), and an outdoor fan (not shown). The compressor compresses refrigerant into a high temperature, high pressure state. The outdoor heat exchanger emits internal latent heat to the outside while converting the high temperature, high pressure refrigerant compressed by the compressor into liquid. The expansion unit reduces the pressure of the refrigerant, which has been converted into liquid by the outdoor heat exchanger, by adjusting the flow rate of the refrigerant. The outdoor fan blows air to the outdoor heat exchanger. The outdoor unit 30 selectively drives the outdoor fan and the compressor according to a control signal from the first controller 14 and distributes and controls the flow of refrigerant circulating in the indoor unit.

Here, the compressor, the outdoor heat exchanger, and the expansion unit are connected to each other through refrigerant tubes. A refrigerant tube connected to the expansion unit is connected to the indoor unit 10 through an external refrigerant tube. An outdoor fan, an outdoor controller, and the like are connected to each other through power and communication lines. The communication and power lines connected to the outdoor controller are connected to the first controller 14 and the first communicator 13 of the indoor unit 10.

A method to perform power supply and communication between an indoor unit and a remote controller provided in an air conditioner is described below with reference to FIG. 1.

In the case where a communication signal is transmitted from the indoor unit 10 to the remote controller 20 in the air conditioner, the first controller 14 in the indoor unit 10 outputs a communication signal through the first transmitting terminal Tx1 of the first controller 14 and the output communication signal is then input to the first converter 12.

The first converter 12 incorporates the communication signal into power supplied from the first power unit 11 and transmits the resulting power to the remote controller 20.

Then, when the power incorporating the communication signal is input to the remote controller 20 through the polarity-free unit 21 of the remote controller 20, the power incorporating the communication signal is transmitted to the second converter 22. The second converter 22 reconstructs the communication signal incorporated into the power and transmits the reconstructed communication signal to the second receiving terminal Rx2 of the second controller 24 through the second communicator 23 of the remote controller 20.

The second controller 24 of the remote controller 20 receives the communication signal of the indoor unit 10 through the second receiving terminal Rx2 and the second power unit 25 of the remote controller 20 receives the power from the second converter 22 and supplies drive power to each component of the remote controller 20 and charges a charge storage element in the second power unit 25 with part of the power.

The first controller 14 in the indoor unit 10 may receive a communication signal, which is output through the first transmitting terminal Tx1 of the first controller 14, through the first receiving terminal Rx1 of the first controller 14 to confirm that the communication signal has been correctly transmitted through the first transmitting terminal Tx1 of the first controller 14.

In addition, in the case where a communication signal is transmitted from the remote controller 20 to the indoor unit 10 in the air conditioner, the second controller 24 in the remote controller 20 outputs a communication signal through the second transmitting terminal Tx2 of the second controller 24 and the output communication signal is then input to the second converter 22.

The second converter 22 incorporates the communication signal into DC power supplied from the indoor unit 10 and transmits the resulting power to the first converter 12 of the indoor unit 10.

When a communication signal is transmitted from the remote controller 20 to the indoor unit 10, the indoor unit 10 outputs a high communication signal through the first transmitting terminal Tx1 of the indoor unit 10.

The first converter 12 of the indoor unit 10 separates the communication signal from the power transmitted to the first converter 12 and transmits the communication signal to the first receiving terminal Rx1 of the first controller 14 through the first communicator 13.

A high or low signal is input to the first receiving terminal Rx1 of the first controller 14 according to the magnitude of a voltage induced in the first converter 12.

The second controller 24 in the remote controller 20 may receive a communication signal, which is output through the second transmitting terminal Tx2 of the second controller 24, through the second receiving terminal Rx2 of the second controller 24 to confirm that the communication signal has been correctly transmitted through the second transmitting terminal Tx2 of the second controller 24.

The indoor unit 10 and the remote controller 20 perform communication with each other by repeatedly transmitting and receiving communication signals to and from each other in the above manner.

Figure 2:
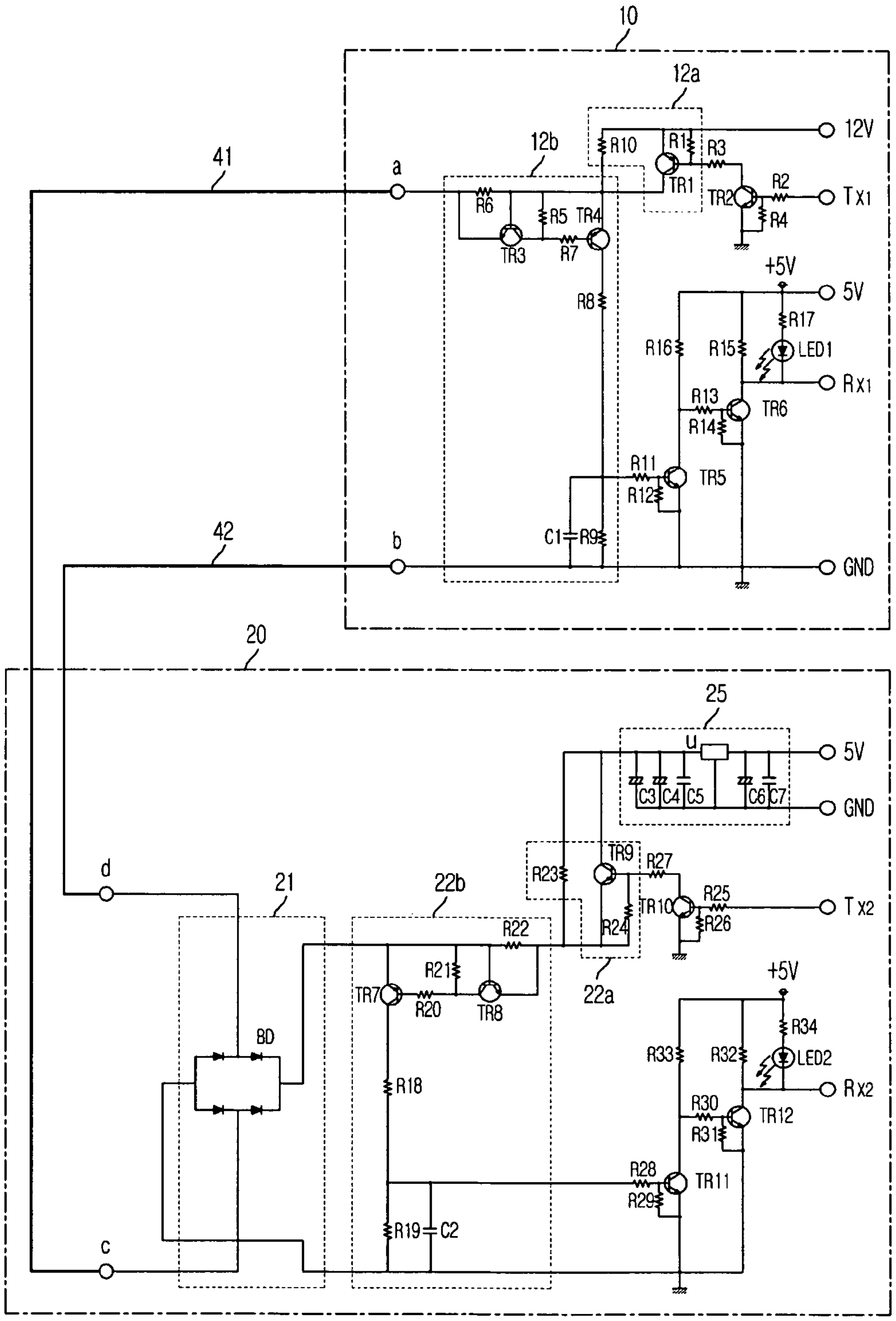
FIG. 2 illustrates parallel processing circuits provided in the air conditioner according to the embodiment.

FIG. 2 illustrates parallel processing circuits provided in the air conditioner according to an embodiment. The parallel processing circuits are provided respectively in the indoor unit 10 and the remote controller 20 to perform power supply and communication between the indoor unit 10 and the remote controller 20. The parallel processing circuits are described below in detail.

First, the parallel processing circuit provided in the indoor unit 10 is described below.

The first power unit 11 of the indoor unit 10 includes a DC power terminal of about 12V and a ground terminal.

The first controller 14 of the indoor unit 10 includes a first transmitting terminal Tx1 and a first receiving terminal Rx1 which are connected to the first communicator 13. That is, the first transmitting terminal Tx1 and the first receiving terminal Rx1 of the first controller 14 are connected to a transmitting terminal (not shown) and a receiving terminal (not shown) of the first communicator 13, respectively.

The first modulator 12*a* of the first converter 12 includes a first transistor TR1 and a first resistor R1 which are modulation switching elements to adjust power supply.

Here, the first transistor TR1 includes a PNP type transistor, the emitter of the first transistor TR1 is connected to the power terminal, and a first resistor R1 is connected between the emitter and base of the first transistor TR1.

The first transmitting terminal Tx1 of the indoor unit 10 is connected to a second transistor TR2 which is turned on or off according to a high or low signal.

The second transistor TR2 includes an NPN type transistor, the base of the second transistor TR2 is connected to the first transmitting terminal Tx1 through the second resistor R2, and the collector of the second transistor TR2 is connected to the base of the first transistor TR1 through a third resistor R3.

A fourth resistor R4 is connected between the base of the second transistor TR2 and the ground terminal.

The first demodulator 12*b* of the first converter 12 includes a third transistor TR3 (corresponding to the first demodulation switching element), a fourth transistor TR4 (corresponding to the third demodulation switching element), a fifth resistor R5, a sixth resistor R6, a seventh resistor R7, an eighth resistor R8, and a ninth resistor R9.

Here, the third transistor TR3 includes an NPN type transistor, the base of the third transistor TR3 is connected to the collector of the first transistor TR1, and the fifth resistor R5 is connected between the base and emitter of the third transistor TR3.

The sixth resistor R6 is connected between the base and emitter of the third transistor TR3 and the collector of the third transistor TR3 is connected to the base of the fourth transistor TR4 through the seventh resistor R7.

Here, the emitter of the third transistor TR3 and the sixth resistor R6 are connected to the first connection terminal a of the first demodulator 12*b* and the ground terminal is connected to the second connection terminal b of the first demodulator 12*b*.

The fourth transistor TR4 includes a PNP type transistor, the emitter of the fourth transistor TR4 is connected to the collector of the first transistor TR1, and the collector of the fourth transistor TR4 is connected to the ground terminal through the eighth resistor R8 and the ninth resistor R9 that are connected in series. Here, each of the eighth resistor R8 and the ninth resistor R9 is a first distribution resistance element.

A first capacitor C1 is connected in parallel to the ninth resistor R9.

The first demodulator 12*b* of the first converter 12 is connected to the first modulator 12*a* through a 10th resistor R10 (corresponding to the first modulation resistance element). The 10th resistor R10 is connected between the emitter and collector of the first transistor TR1, and is also connected to both the emitter of the fourth transistor TR4 and to the base of the third transistor TR3.

The parallel processing circuit further includes a fifth transistor TR5, a sixth transistor TR6, an 11th resistor R11, a 12th resistor R12, a 13th resistor R13, a 14th resistor R14, a 15th resistor R15, a 16th resistor R16, and a 17th resistor R17 which are connected between the ground terminal and the first receiving terminal Rx1 of the indoor unit 10.

The fifth transistor TR5 includes an NPN type transistor, the base of the fifth transistor TR5 is connected to the eighth resistor R8 and the ninth resistor R9 through the 11th resistor R11, and the 12th resistor R12 is connected between the base and emitter of the fifth transistor TR5.

The collector of the fifth transistor TR5 is connected to the base of the sixth transistor TR6 through the 13th resistor R13.

The sixth transistor TR6 includes an NPN transistor and a 14th resistor R14 is connected between the base and emitter of the sixth transistor TR6.

The collector of the sixth transistor TR6 is connected to the 5V power terminal through the 15th resistor R15 and is also connected to the first receiving terminal Rx1.

The 16th resistor R16 is connected between the 5V power terminal and the collector of the fifth transistor TR5 and an first light emitting diode LED1 and the 17th resistor R17 are connected in series between the 5V power terminal and the first receiving terminal Rx1.

Next, the parallel processing circuit provided in the remote controller 20 is described below.

The second power unit 25 of the remote controller 20 includes a DC power terminal of about 5V and a ground terminal.

The second controller 24 of the remote controller 20 includes a second transmitting terminal Tx2 and a second receiving terminal Rx2 which are connected to the second communicator 23. That is, the second transmitting terminal Tx2 and the second receiving terminal Rx2 of the second controller 24 are connected to a transmitting terminal (not shown) and a receiving terminal (not shown) of the second communicator 23, respectively.

The polarity-free unit 21 of the remote controller 20 includes a bridge diode BD.

The bridge diode BD is connected between a third connection terminal c connected to the first connection terminal a of the first converter 12 and a fourth connection terminal d connected to the second connection terminal b of the first converter 12.

The second demodulator 22*b* of the second converter 22 includes a seventh transistor TR7 (corresponding to the second demodulation switching element), an eighth transistor TR8 (corresponding to the fourth demodulation switching element), an 18th resistor R18, a 19th resistor R19, a 20th resistor R20, a 21st resistor R21, and a 22nd resistor R22.

The seventh transistor TR7 includes a PNP type transistor, the emitter of the seventh transistor TR7 is connected to the bridge diode BD and the collector thereof is connected to the ground terminal through the 18th resistor R18 and the 19th resistor R19 that are connected in series. Here, each of the 18th resistor R18 and the 19th resistor R19 is a second distribution resistance element.

A second capacitor C2 is connected in parallel to the ninth resistor R9.

The base of the seventh transistor TR7 is connected to the eighth transistor TR8 through the 20th resistor R20.

The eighth transistor TR8 includes an NPN type transistor, the 21st resistor R21 is connected between the base and collector of the eighth transistor TR8, and the 22nd resistor R22 is connected between the base and emitter of the eighth transistor TR8.

The second demodulator 22*b* of the second converter 22 is connected to the second modulator 22*a* through a 23rd resistor R23.

The second modulator 22*a* of the second converter 22 includes a ninth transistor TR9 (corresponding to the second modulation switching element) and a 24th resistor R24.

The ninth transistor TR9 includes a PNP type transistor, the collector of the ninth transistor TR9 is connected to the second power unit 25, and the 24th resistor R24 is connected between the emitter and base of the ninth transistor TR9.

The second transmitting terminal Tx2 of the remote controller 20 is connected to a 10th transistor TR10 which is turned on or off according to a high or low signal.

The 10th transistor TR10 includes an NPN type transistor, the base of the 10th transistor TR10 is connected to the second transmitting terminal Tx2 through the 25th resistor R25, a 26th resistor R26 is connected between the base and the ground terminal, and the collector is connected to the base of the ninth transistor TR9 through a 27th resistor R27.

The parallel processing circuit of the remote controller 20 further includes an 11th transistor TR11, a 12th transistor TR12, an 28th resistor R28, a 29th resistor R29, a 30th resistor R30, a 31st resistor R31, a 32nd resistor R32, a 33rd resistor R33, and a 34th resistor R34 which are connected between the ground terminal and the second receiving terminal Rx2 of the remote controller 20.

The 11th transistor TR11 includes an NPN type transistor, the base of the 11th transistor TR11 is connected to the 18th resistor R18 and the 19th resistor R19 through the 28th resistor R28, and the 29th resistor R29 is connected between the base and emitter of the 11th transistor TR11.

The collector of the 11th transistor TR11 is connected to the base of the 12th transistor TR12 through the 30th resistor R30.

The 12th transistor TR12 includes an NPN transistor and a 31st resistor R31 is connected between the base and emitter of the 12th transistor TR12.

The collector of the 12th transistor TR12 is connected to the 5V power terminal through the 32nd resistor R32 and is also connected to the first receiving terminal Rx1.

The 33rd resistor R33 is connected between the 5V power terminal and the collector of the 11th transistor TR11 and an second light emitting diode LED2 and the 34th resistor R34 are connected in series between the 5V power terminal and the second receiving terminal Rx2.

The second power unit 25 of the remote controller 20 includes a constant voltage regulator U and a plurality of capacitors C3 to C7.

The constant voltage regulator U converts a DC power of about 12V to a DC power of about 5V and supplies the DC power of about 5V as a drive power to each component.

The third, fourth, and fifth capacitors C3, C4, and C5 are connected in parallel between the ground terminal and the input terminal of the constant voltage regulator U and the sixth and seventh capacitors C6 and C7 are connected in parallel between the ground terminal and the output terminal of the constant voltage regulator U. Here, the plurality of capacitors is charged with power.

Figure 3:
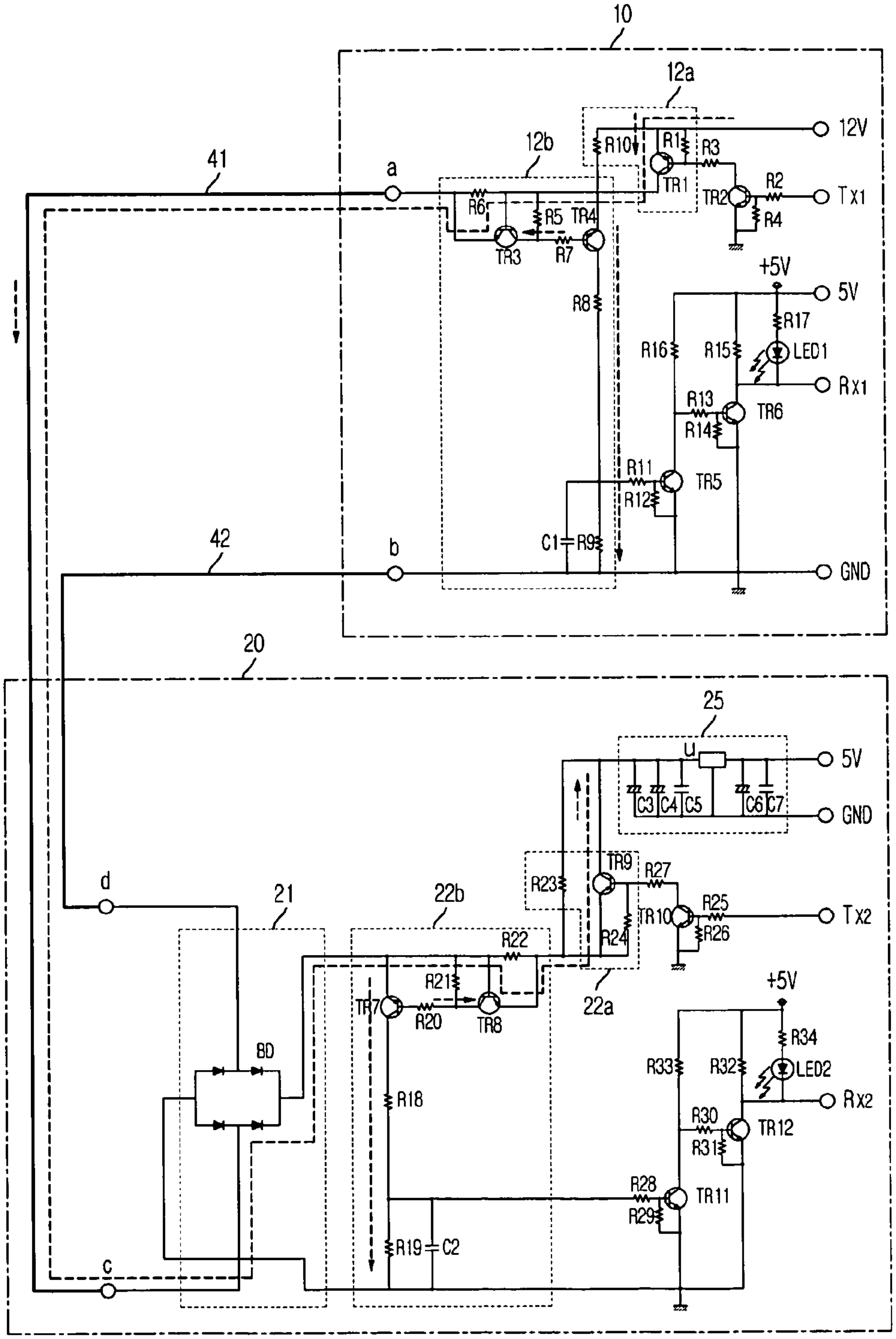
FIGS. 3 and 4 illustrate current flow in the parallel processing circuits provided in the air conditioner according to the embodiment.
Figure 4:
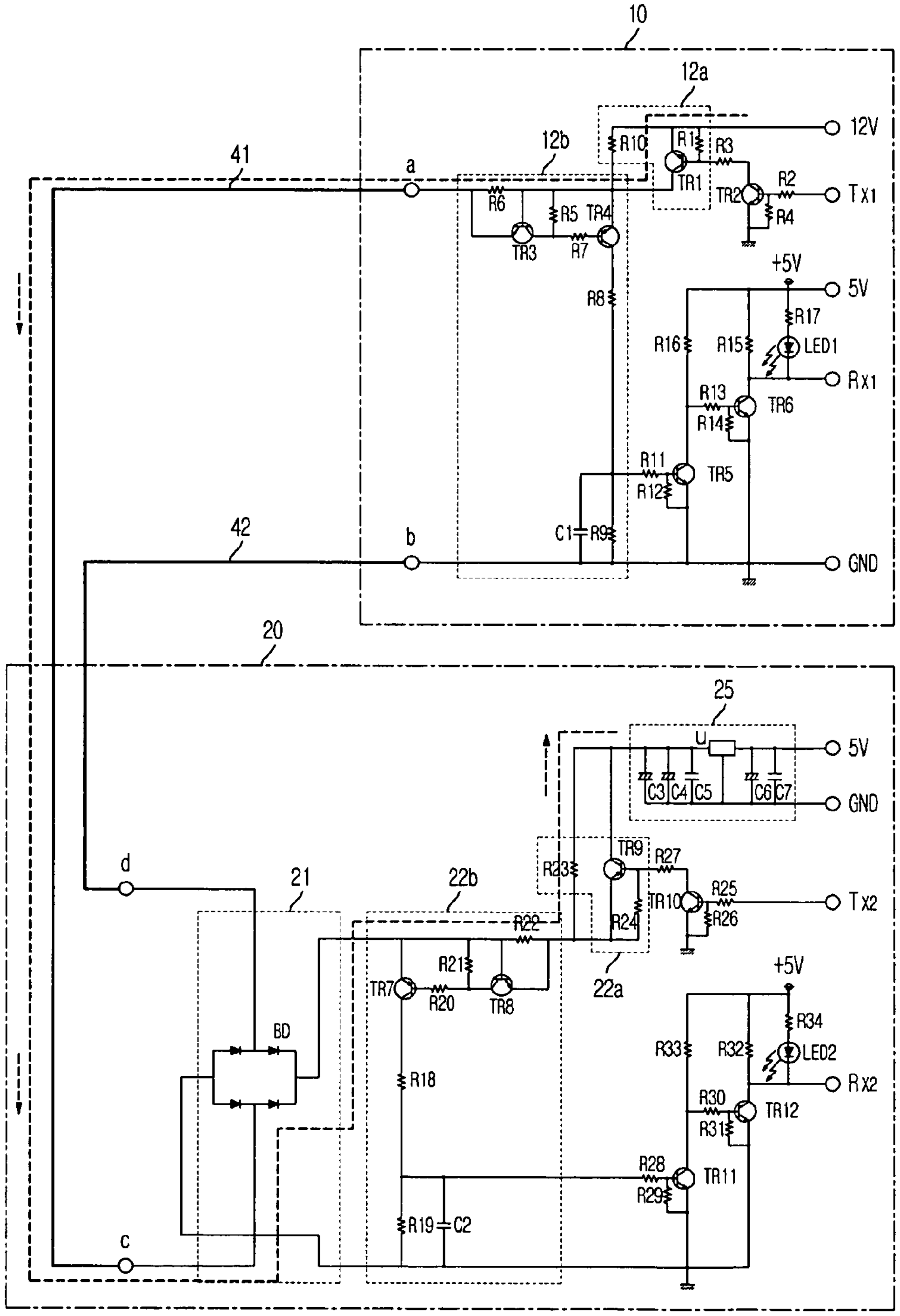

FIGS. 3 and 4 illustrate current flow in the parallel processing circuits provided in the air conditioner when power and a communication signal are transmitted from the indoor unit 10 to the remote controller 20.

Specifically, FIG. 3 illustrates current flow when a high communication signal is transmitted to the remote controller 20 and FIG. 4 illustrates current flow when a low communication signal is transmitted to the remote controller 20.

As shown in FIG. 3, when a high communication signal is output through the first transmitting terminal Tx1 of the indoor unit 10, the output high communication signal turns on the second transistor TR2 and the first transistor TR1 is then turned on as the second transistor TR2 is turned on.

Current that has passed through the first transistor TR1 is applied to the base of the third transistor TR3, turning on the third transistor TR3, and the fourth transistor TR4 is then turned on as the third transistor TR3 is turned on.

Current that has passed through the first transistor TR1 induces a voltage at the sixth resistor R6 (corresponding to the first demodulation resistance element) and the third transistor TR3 is turned on due to the induced voltage.

The sixth resistor R6 is replaceable with a current detection element and the third transistor TR3 is replaceable with an element that is turned on or off according to the detected current.

Current flowing in the fourth transistor TR4 flows to the first receiving terminal Rx1 of the indoor unit 10.

Here, voltage division occurs between the eighth and ninth resistance elements R8 and R9 and a current corresponding to the divided voltage flows through the fourth transistor TR4 to separate a communication signal from the power (a voltage signal of about 5V) incorporating the communication signal and the separated communication signal is provided to the fifth transistor TR5.

As the fourth transistor TR4 is turned on, the fifth transistor TR5 is turned on. Here, the sixth transistor TR6 is turned off since no current is applied to the base of the sixth transistor TR6.

Accordingly, current flowing through the fourth transistor TR4 is received as a high signal by the first receiving terminal Rx1 through the first light emitting diode LED1 and the 16th and 17th resistance elements R16 and R17.

Since a communication signal transmitted from the first transmitting terminal Tx1 of the indoor unit 10 is received by the first receiving terminal Rx1 of the indoor unit 10 in this manner, it is possible to confirm whether or not the communication signal has been correctly transmitted from the first transmitting terminal Tx1 of the indoor unit 10.

On the other hand, current flowing through the third transistor TR3 flows to the bridge diode BD of the remote controller 20 and current rectified through the bridge diode BD turns on the seventh transistor TR7 and the eighth transistor TR8 is then turned on as the seventh transistor TR7 is turned on.

Current flowing through the seventh transistor TR7 flows to the second receiving terminal Rx2 of the remote controller 20.

Here, voltage division occurs between the 18th and 19th resistance elements R18 and R19 and a current corresponding to the divided voltage flows, thereby separating a communication signal from the power incorporating the communication signal.

As the seventh transistor TR7 is turned on, the 11th transistor TR11 is turned on. As the 11th transistor TR11 is turned on, no current is applied to the base of the 12th transistor TR12, thereby turning off the 12th transistor TR12.

Accordingly, current flowing through the 11th transistor TR11 is received as a high signal by the second receiving terminal Rx2 through the second light emitting diode LED2 and the 33rd and 34th resistance elements R33 and R34.

As the seventh transistor TR7 is turned on, the eighth transistor TR8 is turned on. As the eighth transistor TR8 is turned on, the ninth transistor TR9 is turned on. Accordingly, power is supplied to the second power unit 25 and the second power unit 25 is charged with part of the power.

As shown in FIG. 4, when a low communication signal is output through the first transmitting terminal Tx1 of the indoor unit 10, the output low communication signal turns off the second transistor TR2 and the first transistor TR1 is then turned off as the second transistor TR2 is turned off.

Accordingly, 12V DC power is transferred to the first modulator 12*a* through the 10th resistor R10.

Although current is applied to the sixth resistor R6 through the 10th resistor R10, it does not induce a sufficient voltage at the sixth resistor R6, failing to turn on the third transistor TR3, since the level of the current transferred to the sixth resistor R6 is small.

As the third transistor TR3 is turned off, the fourth transistor TR4 is turned off. As the fourth transistor TR4 is turned off, the fifth transistor TR5 is turned off. At this time, the sixth transistor TR6 is short-circuited. Accordingly, a low signal is transmitted from the first transmitting terminal Tx1 of the indoor unit 10.

On the other hand, current flowing through the sixth resistor R6 flows to the bridge diode BD of the remote controller 20. Current rectified through the bridge diode BD does not induce a sufficient voltage at the 22nd resistor R22, failing to turn on the eighth transistor TR8, since the level of the current rectified through the bridge diode BD is small.

As the eighth transistor TR8 is turned off, the seventh transistor TR7 is turned off. As the seventh transistor TR7 is turned off, the 11th transistor TR11 is turned off. At this time, the 12th transistor TR12 is turned off. Accordingly, a low signal is received by the second receiving terminal Rx2 of the remote controller 20.

Current flowing through the 22nd resistor R22 is then provided to the second power unit 25.

Figure 5:
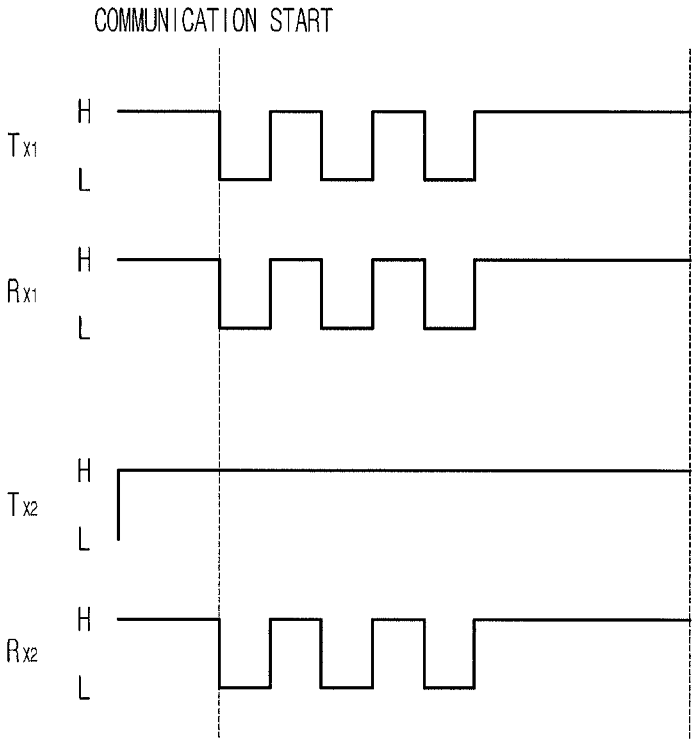
FIGS. 5 and 6 illustrate waveforms of communication signals in the parallel processing circuits provided in the air conditioner according to the embodiment.

As shown in FIG. 5, the second transmitting terminal Tx2 of the remote controller 20 continuously outputs a high signal, thereby turning on the 10th transistor TR10. As the 10th transistor TR10 is turned on, the ninth transistor TR9 is turned on so that power is supplied to the second power unit 25 through the ninth transistor TR9.

A procedure in which a communication signal is transmitted from the remote controller 20 to the indoor unit 10 is described below based on the parallel processing circuit diagram of FIG. 2 and with reference to FIG. 6.

Figure 6:
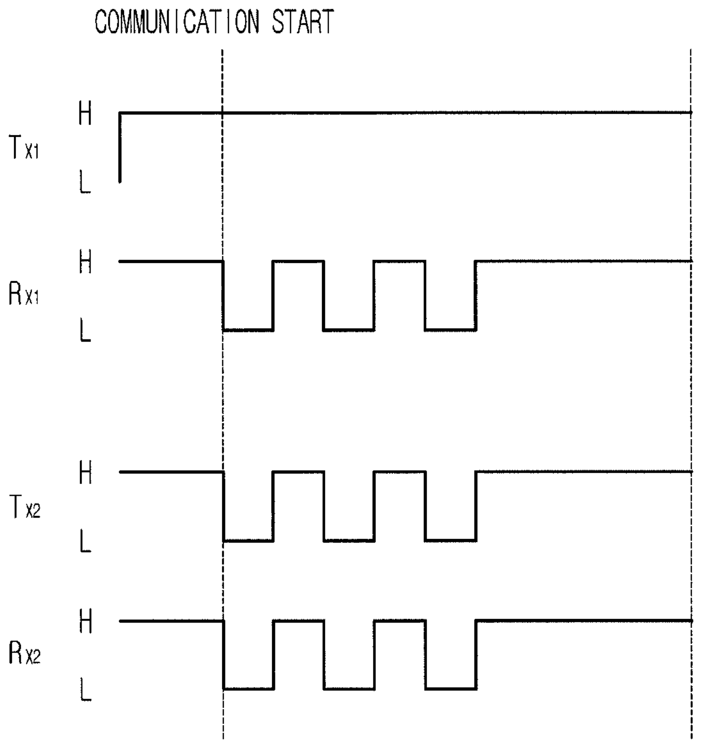

As shown in FIG. 6, when a communication signal is not transmitted from the indoor unit 10 to the remote controller 20, the first transmitting terminal Tx1 of the indoor unit 10 continuously outputs a high signal.

Accordingly, when a high communication signal is transmitted from the second transmitting terminal Tx2 of the remote controller 20 to the indoor unit 10, the high signal is input to the 10th transistor TR10, thereby turning on the 10th transistor TR10. As the 10th transistor TR10 is turned on, the ninth transistor TR9 is turned on.

As the ninth transistor TR9 is turned on, a DC power of about 5V is received from the second power unit 25. Thus, the high signal is incorporated into the power.

Then, a voltage is induced at the 22nd resistor R22, thereby turning on the eighth transistor TR8. As the eighth transistor TR8 is turned on, the seventh transistor TR7 is turned on.

Current flowing through the seventh transistor TR7 turns on the third transistor TR3 provided in the first demodulator 12*b* of the indoor unit 10 through the bridge diode BD. As the third transistor TR3 is turned on, the fourth transistor TR4 is turned on. As the fourth transistor TR4 is turned on, the fifth transistor TR5 is turned on. As the fifth transistor TR5 is turned on, no current flows through the base of the sixth transistor TR6, thereby turning off the sixth transistor TR6.

As the fifth transistor TR5 is turned on, voltage division occurs between the eighth and ninth resistance elements R8 and R9 and a current corresponding to the divided voltage flows through the fourth transistor TR4 to separate a communication signal from the power (a voltage signal of about 5V) incorporating the communication signal and the separated communication signal is provided to the fifth transistor TR5.

Then, current flowing through the fifth transistor TR5 flows to the first light emitting diode LED1 and the 16th and 17th resistance elements R16 and R17 and thereby a high signal is received by the first receiving terminal Rx1 of the indoor unit 10.

That is, in the case where a communication signal is not transmitted from the indoor unit 10 to the remote controller 20, the first transmitting terminal Tx1 of the indoor unit 10 continuously outputs a high signal. Therefore, when a high communication signal is transmitted from the remote controller 20 to the indoor unit 10, current flows in the same manner as when a high communication signal is transmitted from the indoor unit 10 to the remote controller 20.

In addition, as the seventh transistor TR7 is turned on, the 11th transistor TR11 is turned on. As the 11th transistor TR11 is turned on, the 12th transistor TR12 is turned on.

As the 11th transistor TR11 is turned on, voltage division occurs between the 18th and 19th resistance elements R18 and R19 and a current corresponding to the divided voltage flows through the fourth transistor TR4. Thus, a communication signal is separated from the power (a voltage signal of about 5V) incorporating the communication signal and the separated communication signal is then applied to the 11th transistor TR11.

Then, current flowing through the 11th transistor TR11 is received as a high signal by the second receiving terminal Rx2 through the second light emitting diode LED2 and the 33rd and 34th resistance elements R33 and R34.

On the other hand, when a low communication signal is transmitted from the second transmitting terminal Tx2 of the remote controller 20 to the indoor unit 10, the low communication signal is input to the 10th transistor TR10, thereby turning off the 10th transistor TR10. As the 10th transistor TR10 is turned off, the ninth transistor TR9 is turned off.

As the ninth transistor TR9 is turned off, DC power of the second power unit 25 is provided to the 22nd resistor R22 (corresponding to the second demodulation resistance element) through the 23rd resistor R23 (corresponding to the second modulation resistance element).

Here, since the level of current flowing through the 22nd resistor R22 is very small, a very small voltage is induced at the 22nd resistor R22. The induced voltage is not sufficient to turn on the eighth transistor TR8.

Accordingly, the eighth transistor TR8 is turned off, thereby turning off the seventh transistor TR7.

As the seventh transistor TR7 is turned off, the 11th transistor TR11 is turned off, thereby turning on the 12th transistor TR12. As the 12th transistor TR12 is turned on, the 12th transistor TR12 is short-circuited so that a low signal is received by the second receiving terminal Rx2.

A current flowing through the 22nd resistor R22 as the seventh transistor TR7 is turned off flows to the sixth resistor R6 provided in the first demodulator 12*b* of the indoor unit 10 through the bridge diode BD.

Here, since the level of current flowing through the sixth resistor R6 is very small, a very small voltage is induced at the 22nd resistor R22. The induced voltage is not sufficient to turn on the third transistor TR3.

Accordingly, the third transistor TR3 is turned off, thereby turning off the fourth transistor TR4.

As the fourth transistor TR4 is turned off, the fifth transistor TR5 is turned off, thereby turning on the sixth transistor TR6. As the sixth transistor TR6 is turned on, the sixth transistor TR6 is short-circuited so that a low signal is received by the first receiving terminal Rx1.

As is apparent from the above description, an air conditioner according to the embodiments has a variety of advantages.

For example, since an indoor unit and a remote controller are connected using two lines so that the indoor unit and the remote controller perform communication with each other and the indoor unit supplies power to the remote controller through the two lines, it may be possible to reduce the number of lines between the indoor unit and the remote controller, thereby reducing material costs, to easily install the lines, thereby reducing line installation time, and also to reduce crosstalk between the lines, thereby enabling reliable communication.

In addition, since communication and power supply are performed together using a bridge diode polarity-free unit through which the two lines are connected, it may be possible to prevent failure of a parallel processing circuit due to incorrect line connection, enabling normal communication.

Further, since parallel processing circuits to perform communication and power supply between the indoor unit and the remote controller are designed and manufactured using inexpensive resistors and transistors, it may be possible to reduce manufacturing costs of the parallel processing circuits.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. An air conditioner, comprising:

an indoor unit; and a remote controller connected to the indoor unit through two lines to receive power from the indoor unit and perform communication with the indoor unit, wherein the indoor unit comprises a first modulation switching element to modulate power through the two lines according to a communication signal that is transmitted to the remote controller, a first demodulation switching element that is driven according to a communication signal transmitted from the remote controller through the two lines, and a first distribution resistance element to demodulate the communication signal transmitted from the remote controller through the two lines, wherein the remote controller comprises a second modulation switching element to modulate power through the two lines according to a communication signal that is transmitted to the indoor unit, a second demodulation switching element that is driven according to a modulated power through the two lines transmitted from the indoor unit, and a second distribution resistance element to demodulate the modulated power transmitted from the indoor unit through the two lines to obtain a communication signal, and wherein the remote controller further comprises a power unit that is charged with the modulated power provided from the indoor unit through the two lines, wherein the indoor unit further comprises a power terminal to supply the power, and a first modulation resistance element connected to the power terminal and the first modulation switching element, the first modulation resistance element reducing a level of power provided from the power terminal when the first modulation switching element is turned off.

2. The air conditioner according to claim 1, wherein the first modulation switching element comprises a transistor and the modulation resistance element is connected between an emitter and a collector of the transistor.

3. The air conditioner according to claim 2, wherein the indoor unit further comprises a first demodulation resistance element to adjust a voltage induced at the first demodulation switching element according to operation of the first modulation switching element.

4. The air conditioner according to claim 3, wherein, when the indoor unit transmits a low signal, the power provided from the power terminal is reduced through the first modulation resistance element and the first demodulation resistance element and the reduced power is provided to the remote controller to turn off the second demodulation switching element to allow the remote controller to receive a low signal.

5. The air conditioner according to claim 1, wherein the indoor unit transmits a high signal when no communication signal is transmitted to the remote controller.

6. The air conditioner according to claim 5, wherein the indoor unit further comprises a first transmitting terminal, a first receiving terminal, and a third modulation switching element connected to the first receiving terminal, wherein the third modulation switching element is driven according to a communication signal transmitted from the first transmitting terminal and provides the communication signal to the first receiving terminal.

7. The air conditioner according to claim 6, wherein, if the second modulation switching element is turned on to maintain a high signal at the first transmitting terminal when a high signal is transmitted to the remote controller, the third demodulation switching element is turned on due to the maintained high signal, and, if the second modulation switching element is turned off to block a high signal at the first transmitting terminal when a low signal is transmitted to the remote controller, the third demodulation switching element is turned off due to the blocked high signal.

8. The air conditioner according to claim 1, wherein the remote controller further comprises a second modulation resistance element connected to the power unit and the second modulation switching element to reduce a level of the power provided from the power unit when the second modulation switching element is turned off.

9. The air conditioner according to claim 1, wherein the second modulation switching element comprises a transistor and the second modulation resistance element is connected between an emitter and a collector of the transistor.

10. The air conditioner according to claim 9, wherein the remote controller further comprises a second demodulation resistance element to adjust a voltage induced at the second demodulation switching element according to operation of the second modulation switching element.

11. The air conditioner according to claim 1, wherein the remote controller further comprises a second transmitting terminal, a second receiving terminal, and a fourth demodulation switching element connected to the second receiving terminal, wherein the fourth demodulation switching element is driven according to a communication signal transmitted from the second transmitting terminal and provides the communication signal to the second receiving terminal.

12. An air conditioner, comprising a remote controller, the remote controller comprising:

a second demodulation switching element to receive modulated power from an external device and to be driven according to the modulated power;

a second distribution resistance element connected to the second demodulation switching element to demodulate the modulated power to obtain a communication signal; and a second modulation switching element to be driven according to a communication signal that is transmitted to the external device; and a power unit to be charged with power supplied from the external device and to provide the power as a drive power, wherein the remote controller further comprises a second modulation resistance element to reduce a level of the power provided from the power unit if the second modulation switching element is turned off when the remote controller transmits a signal to the external device.

13. The air conditioner according to claim 12, wherein the remote controller further comprises a second demodulation resistance element to adjust a voltage induced at the second demodulation switching element according to operation of the second modulation switching element.

14. The air conditioner according to claim 13, wherein, when the second modulation switching element is turned off, power is provided to the second modulation resistance element and the second demodulation resistance element to block power supply from the external device.

* * * * *